US010693327B2

(12) United States Patent
Yang et al.

(10) Patent No.: US 10,693,327 B2
(45) Date of Patent: Jun. 23, 2020

(54) WIRELESS POWER TRANSMITTER (71) Applicant: WITS Co., Ltd., Yongin-si, Gyeonggi-do (KR)

(72) Inventors: Kwang Hun Yang, Suwon-si (KR); Keun Soo Ha, Suwon-si (KR)

(73) Assignee: WITS Co., Ltd., Gyeonggi-do (KR)

(*) Notice: Subject to any disclaimer, the term of this patent is extended or adjusted under 35 U.S.C. 154(b) by 159 days.

(21) Appl. No.: 15/867,316

(22) Filed: Jan. 10, 2018

(65) Prior Publication Data
US 2018/0233966 A1 Aug. 16, 2018

(30) Foreign Application Priority Data

Feb. 16, 2017 (KR) .................. 10-2017-0021210

(51) Int. Cl.
H02J 50/60 (2016.01)
H02J 50/10 (2016.01)
G01V 3/10 (2006.01)
H02J 50/90 (2016.01)
H02J 7/02 (2016.01)

(52) U.S. Cl.
CPC ............ H02J 50/60 (2016.02); G01V 3/10 (2013.01); H02J 7/025 (2013.01); H02J 50/10 (2016.02); H02J 50/90 (2016.02)

(58) Field of Classification Search
CPC .. H02J 50/60; H02J 50/10; H02J 7/025; H02J 50/90; G01V 3/10
See application file for complete search history.

(56) References Cited

U.S. PATENT DOCUMENTS

| 9,859,051 | B2* | 1/2018 | Ren ..................... H01F 38/14 |
| 2008/0164876 | A1* | 7/2008 | Sakakura ............. G01R 33/385 |
| | | | 324/318 |
| 2008/0303479 | A1* | 12/2008 | Park ..................... H02J 7/025 |
| | | | 320/108 |
| 2012/0032632 | A1* | 2/2012 | Soar ..................... H01F 38/14 |
| | | | 320/108 |

(Continued)

FOREIGN PATENT DOCUMENTS

JP 2010-284006 A 12/2010
JP 2011-244624 A 12/2011

Primary Examiner — Alfonso Perez Borroto
Assistant Examiner — Esayas G Yeshaw
(74) Attorney, Agent, or Firm — Harness, Dickey & Pierce, P.L.C.

(57) ABSTRACT

A wireless power transmitter includes: a power transmitting coil configured to receive alternating current (AC) power applied thereto and wirelessly transmit the AC power; a sensing device configured to output one or more sensing signals having magnitudes that are variable based on an approach of an object; and a circuitry configured to determine whether an acknowledgement signal has been received from a wireless power receiver and whether a foreign object has entered a region of the wireless power transmitter based on a change in the magnitudes of the one or more sensing signals, and configured to control transmission of the AC power through the power transmitting coil based on a result of the determining of whether the acknowledgement signal has been received from the wireless power receiver and whether the foreign object has entered the region of the wireless power transmitter.

17 Claims, 5 Drawing Sheets (56) References Cited

U.S. PATENT DOCUMENTS

| | | | |
|---|---|---|---|
| 2014/0015335 A1* | 1/2014 | Lee | H01F 38/14 |
| | | | 307/104 |
| 2014/0035379 A1* | 2/2014 | Stevens | H02J 7/0013 |
| | | | 307/104 |
| 2014/0143933 A1* | 5/2014 | Low | G04C 10/00 |
| | | | 2/170 |
| 2014/0312702 A1* | 10/2014 | Uchida | H02J 17/00 |
| | | | 307/80 |
| 2015/0326028 A1* | 11/2015 | Suzuki | H02J 7/025 |
| | | | 307/104 |
| 2016/0181818 A1* | 6/2016 | Joye | H02J 5/005 |
| | | | 307/104 |
| 2018/0062430 A1* | 3/2018 | Matsumoto | H02J 7/00 |

* cited by examiner

WIRELESS POWER TRANSMITTER

CROSS-REFERENCE TO RELATED APPLICATIONS

This application claims the benefit under 35 U.S.C. § 119(a) of Korean Patent Application No. 10-2017-0021210 filed on Feb. 16, 2017 in the Korean Intellectual Property Office, the entire disclosure of which is incorporated herein by reference for all purposes.

BACKGROUND

1. Field

The following description relates to a wireless power transmitter that is operable to wirelessly transmit power.

2. Description of Related Art

Recently, many mobile apparatuses that are capable of being wirelessly charged with power have been released onto the market. Therefore, many wireless power transmitters for wirelessly transmitting power to the mobile apparatuses have also been released onto the market. Wireless power transmitters need to appropriately cope with a situation of a wireless power receiver wirelessly receiving power, a state of a battery storing the received power therein, and a change in a situation surrounding the wireless power transmitter, for example.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmitter includes: a power transmitting coil configured to receive alternating current (AC) power applied thereto and wirelessly transmit the AC power; a sensing device configured to output one or more sensing signals having magnitudes that are variable based on an approach of an object; and a circuitry configured to determine whether an acknowledgement signal has been received from a wireless power receiver and whether a foreign object has entered a region of the wireless power transmitter based on a change in the magnitudes of the one or more sensing signals, and configured to control transmission of the AC power through the power transmitting coil based on a result of the determining of whether the acknowledgement signal has been received from the wireless power receiver and whether the foreign object has entered the region of the wireless power transmitter.

The sensing device may include one or more sensing coils disposed inside the power transmitting coil and configured to output the one or more sensing signals.

The one or more sensing coils may be disposed in a region inside an inner diameter of the power transmitting coil.

The circuitry may be further configured to determine, based on the change in the magnitudes of the one or more sensing signals, whether the wireless power receiver moves, and may be further configured to determine that the foreign object enters the region of the wireless power transmitter and to stop transmission of the AC power through the power transmitting coil, in response to determining that the wireless power receiver does not move and the acknowledgement signal is not received.

The circuitry may be further configured to determine that the wireless power receiver moves, in response to a sensing signal, among the one or more sensing signals, having a magnitude, among the magnitudes, that is changed and a sum of the magnitudes of the one or more sensing signals being within a reference range, and may be further configured to otherwise determine that the wireless power receiver does not move.

The circuitry may be further configured to determine, based on the change in the magnitudes of the one or more sensing signals, whether the wireless power receiver moves, and to determine that another wireless power receiver enters the region of the wireless power transmitter, in response to determining that the wireless power receiver does not move, the acknowledgement signal has been received, and a sum of the magnitudes of the one or more sensing signals is equal to or greater than a threshold value.

The circuitry may be further configured to determine, based on the change in the magnitudes of the one or more sensing signals, whether the wireless power receiver moves, and may be further configured to stop transmission of the AC power through the power transmitting coil, in response to determining that the wireless power receiver does not move, the acknowledgement signal has been received, and a sum of the magnitudes of the one or more sensing signals is smaller than a threshold value.

The circuitry may be further configured to end communications with the wireless power receiver, in response to the acknowledgement signal being received and a magnitude of a current of the power transmitting coil not changing.

The circuitry may be further configured to determine whether the foreign object enters the region of the wireless power transmitter, in response to a magnitude of a current of the power transmitting coil changing.

In another general aspect, a wireless power transmitter includes: a power transmitting coil configured to wirelessly transmit the AC power; a sensing device configured to output one or more sensing signals having magnitudes that are variable based on an approach of an object; and a circuitry configured to output the AC power in response to an acknowledgement signal received from a wireless power receiver and the one or more sensing signals during a period in which the power transmitting coil wirelessly transmits the AC power.

The sensing device may include one or more sensing coils disposed inside the power transmitting coil and configured to output the one or more sensing signals.

The one or more sensing coils may be disposed in a region inside an inner diameter of the power transmitting coil.

The circuitry may further be configured to stop outputting the AC power in response to the acknowledgement signal not being received, in a case in which no sensing signal, among the one or more sensing signals, has a magnitude, among the magnitudes, that is changed or a sum of the magnitudes of the one or more sensing signals is outside of a reference range.

The circuitry may be further configured to stop outputting the AC power in response to the acknowledgement signal being input and a sum of the magnitudes of the one or more sensing signals being smaller than a threshold value, in a case in which no sensing signal, among the one or more sensing signals, has a magnitude, among the magnitudes, that is changed or the sum of the magnitudes of the one or more sensing signals is out of a reference range.

The circuitry may be further configured to update information on a number of wireless power receivers that are receiving the power and to output the AC power, in response to the acknowledgement signal being received and a sum of the magnitudes of the one or more sensing signals being greater than a threshold value, in a case in which no sensing signal, among the one or more sensing signals, has a magnitude, among the magnitudes, that is changed or the sum of the magnitudes of the one or more sensing signals is outside of a reference range.

The circuitry may be further configured to end communications with the wireless power receiver, in response to the acknowledgement signal being received, in a case in which a magnitude of a current of the power transmitting coil is not changed.

The circuitry may be further configured to stop outputting the AC power, in response to no sensing signal, among the one or more sensing signals, having a magnitude, among the magnitudes, that is changed or a sum of the magnitudes of the one or more sensing signals being outside of a reference range, in a case in which a magnitude of a current of the power transmitting coil is decreased.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
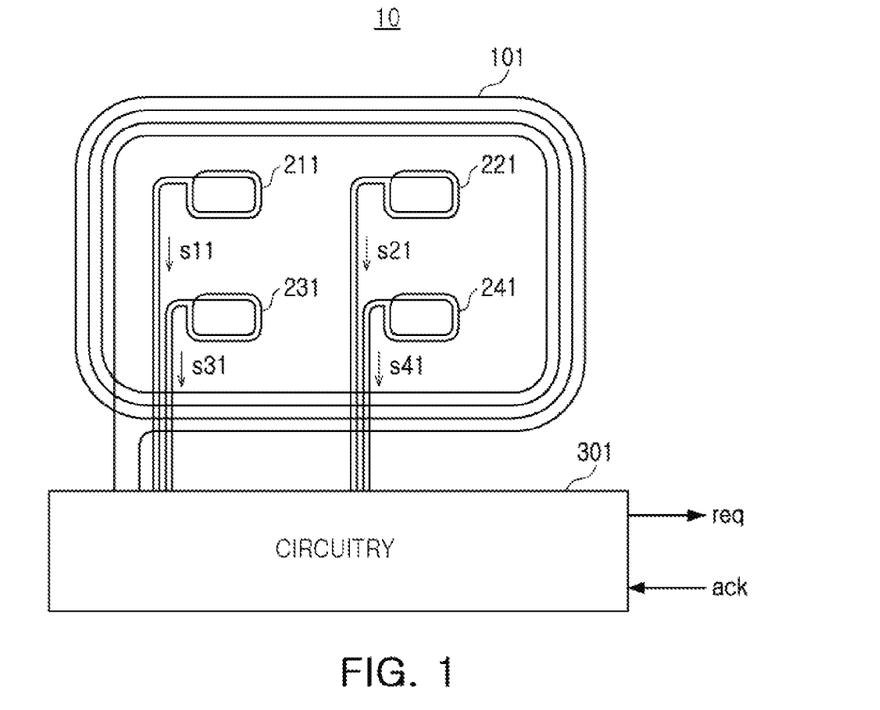
FIG. 1 is a schematic view illustrating a wireless power transmitter, according to an embodiment.

FIG. 1 is a schematic view illustrating a wireless power transmitter 10, according to an embodiment. The wireless power transmitter 10 includes a power transmitting coil 101, sensing coils 211, 221, 231, and 241, and a circuitry 301.

The power transmitting coil 101 wirelessly transmits power depending on an operation of the circuitry 301. The power may be transmitted in a magnetic induction manner, a magnetic resonance manner, or various other manners. In addition, a current flowing through the power transmitting coil 101 may be changed when a situation related to wireless power transmission is changed, for example, when a wireless power receiver that is being charged with the power moves or when a foreign object or the wireless power receiver, approaches the power transmitting coil 101. In detail, when the wireless power receiver that is being charged with the power moves or the foreign object or the wireless power receiver approaches the power transmitting coil 101, a magnitude of a current having a specific frequency component in the current flowing through the power transmitting coil 101 may be changed.

The sensing coils 211, 221, 231, and 241 are sensing units that output sensing signals s11, s21, s31, and s41 of which magnitudes are varied depending on an approach of an object. That is, the sensing coils 211, 221, 231, and 241 output the sensing signals s11, s21, s31, and s41, respectively, depending on the approach of the foreign object or the wireless power receiver. The sensing signals s11, s21, s31, and s41 are, for example, current signals. That is, when the foreign object or the wireless power receiver approaches the sensing coils 211, 221, 231, and 241, magnitudes of currents flowing through each of the sensing coils 211, 221, 231, and 241 may be determined depending on distances of the foreign object or the wireless power receiver and each of the sensing coils 211, 221, 231, and 241. As illustrated in FIG. 1, the sensing coils 211, 221, 231, and 241 are disposed inside the power transmitting coil 101, that is, in a region inside an inner diameter of the power transmitting coil 101.

The circuitry 301 outputs a request signal req requesting transmission of information to the wireless power receiver. In addition, the circuitry 301 receives an acknowledgement signal ack from the wireless power receiver. The acknowledgement signal ack may be an acknowledgement to the request signal req. In addition, the acknowledgement signal ack may be a signal indicating that a communications circuit in the wireless power receiver is being operated, and may include one or more of information on a magnitude of power received by the wireless power receiver, information on power output to a battery of the wireless power receiver, information on a state of charge of the battery of the wireless power receiver, and information on a magnitude of power required by the wireless power receiver.

In addition, the circuitry 301 may transmit the request signal req to the wireless power receiver and receive the acknowledgement signal ack from the wireless power receiver using a separate communications module. The communications module may perform communications using a frequency band that is different from a frequency band in which the power is transmitted. For example, the power is transmitted using a frequency of 6.78 MHz. In this case, the communications module may perform communications between the wireless power receiver and the wireless power transmitter using a frequency of 2.4 GHz.

In addition, the circuitry 301 confirms situations related to wireless transmission of the power using the acknowledgement signal ack, the sensing signals s11, s21, s31, and s41 input from the sensing coils 211, 221, 231, and 241, and a sensing signal for a current flowing through the power transmitting coil 101, and controls the transmission of the power through the power transmitting coil 101 depending on a result of the confirming of the situations related to the wireless transmission of the power. These situations may include any one or any combination of any two or more of a situation in which a new wireless power receiver enters a range of the wireless power transmitter, a situation in which a foreign object enters the range of the wireless power transmitter, a situation in which the wireless power receiver moves, and various types of cross connections.

Figure 2:
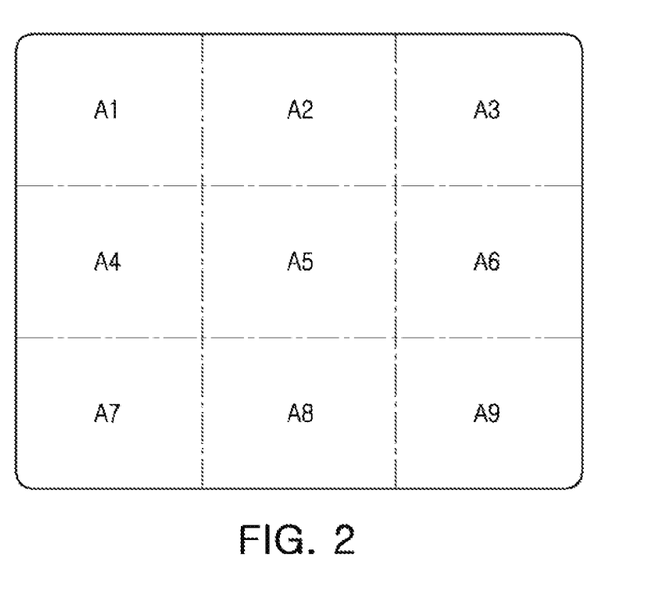
FIG. 2 is a schematic view illustrating a charging region divided into sub-regions in order to determine a position of a wireless power receiver in the wireless power transmitter of FIG. 1, according to an embodiment.

FIG. 2 is a schematic view illustrating a charging region divided into sub-regions A1 to A9 in order to determine a position of a wireless power receiver in the wireless power transmitter 10 of FIG. 1, according to an embodiment 1.

A method in which the circuitry 301 of the wireless power transmitter 10 determines a position of a wireless power receiver or an object approaching the wireless power receiver will be described with reference to FIGS. 1 and 2.

As illustrated in FIG. 1, when the wireless power transmitter 10 includes four sensing coils 211, 221, 231, and 241, a charging region that is chargeable by the wireless power transmitter 10 may be divided into the nine sub-regions A1 to A9, as illustrated in FIG. 2.

The circuitry 301 compares magnitudes of the sensing signals s11, s21, s31, and s41 and reference values with each other to determine in which sub-region of the charging region the object is disposed.

A method in which the circuitry 301 determines a sub-region in which the object is disposed will hereinafter be described with reference to Table 1. The sensing signals s11, s21, s31, and s41 are current signals. In this case, in Table 1, magnitudes of the sensing signals s11, s21, s31, and s41 are represented in mA. In addition, the circuitry 301 replaces all the values that are any minimum value or less among the sensing signals s11, s21, s31, and s41 by 0 and then performs the following operations.

TABLE 1

| Division | Magnitude of Sensing signal | | | | Sub-region in which Object Is Disposed |
|---|---|---|---|---|---|
| | S11 | S21 | S31 | S41 | |
| case 1 | 60 | 0 | 0 | 0 | A1 |
| case 2 | 35 | 35 | 0 | 0 | A2 |
| case 3 | 20 | 20 | 20 | 20 | A5 |
| case 4 | 35 | 0 | 35 | 60 | A4, A9 |
| case 5 | 0 | 60 | 60 | 0 | A3, A7 |

The circuitry 301 determines the number of wireless power receivers disposed in the charging region using the sum of the magnitudes of the sensing signals. That is, the circuitry 301 compares the sum of the magnitudes of the sensing signals with a threshold value determined depending on the number of wireless power receivers with each other to determine the number of wireless power receivers disposed in the charging region.

For example, when the number of wireless power receivers is 1, the threshold value is 60, and when the number of wireless power receivers is 2, the threshold value is 120.

In case 1, case 2, and case 3 in Table 1, the sum of magnitudes of the sensing signals is equal to or greater than 60 and does not exceed 120. Therefore, in case 1, case 2, and case 3, the circuitry 301 determines that the number of wireless power receivers disposed in the charging region is 1.

In case 4 and case 5 in Table 1, the sum of magnitudes of the sensing signals is equal to or greater than 120. Therefore, in case 4 and case 5, the circuitry 301 determines that the number of wireless power receivers disposed in the charging region is 2.

In addition, the circuitry 301 compares each of the sensing signals s11, s21, s31, and s41 with a first reference value (for example, 60) or compares the sum of magnitudes of sensing signals output from adjacent sensing coils among the sensing signals s11, s21, s31, and s41 with a second reference value (for example, 70) to determine a position of the wireless power receiver.

For example, in case 1, a magnitude of the sensing signal s11 is equal to or greater than the first reference value. Therefore, in case 1, the circuitry 301 determines that the wireless power receiver is disposed in the sub-region A1, which is a region corresponding to the sensing coil 211.

In case 2, the sum of magnitudes of the sensing signals s11 and s21 output from adjacent sensing coils 211 and 221 is equal to or greater than the second reference value. Therefore, in case 2, the circuitry 301 determines that the wireless power receiver is disposed in the sub-region A2, which is a region between the adjacent sensing coils 211 and 221.

In case 3, the sum of magnitudes of the sensing signals s11, s21, s31, and s41 output from adjacent sensing coils 211, 221, 231, and 241 is equal to or greater than the second reference value. Therefore, in case 3, the circuitry 301 determines that the wireless power receiver is disposed in the sub-region A5, which is an intermediate region of the adjacent sensing coils 211, 221, 231, and 241.

In case 4, the sum of magnitudes of the sensing signals s11 and s31 output from adjacent sensing coils 211 and 231 is equal to or greater than the second reference value and a magnitude of the sensing signal s41 is equal to or greater than the first reference value. Therefore, in case 4, the circuitry 301 determines that the wireless power receivers are disposed in the sub-region A4 and the sub-region A9.

In case 5, a magnitude of the sensing signal s21 is equal to or greater than the first reference value, and a magnitude of the sensing signal s31 is equal to or greater than the first reference value. Therefore, in case 5, the circuitry 301 determines that the wireless power receivers are disposed in the sub-region A3 and the sub-region A7.

Figure 3:
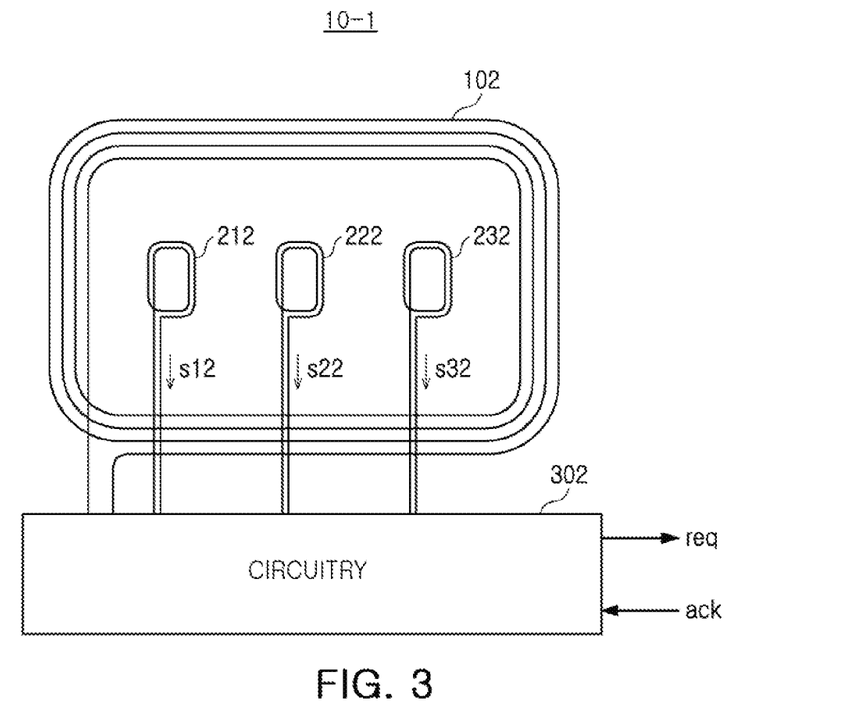
FIG. 3 is a schematic view illustrating a wireless power transmitter, according to another embodiment.

FIG. 3 is a schematic view illustrating a wireless power transmitter 10-1, according to another embodiment. The wireless power transmitter 10-1 includes a power transmitting coil 102 sensing coils 212, 222, and 232, and a circuitry 302.

Functions of each of the power transmitting coil 102, the plurality of sensing coils 212, 222, and 232, and the circuitry 302 can be easily understood with reference to the description of FIG. 1.

That is, the power transmitting coil 102 wirelessly transmits power depending on an operation of the circuitry 302. In addition, when a foreign object or a wireless power receiver approaches the power transmitting coil 102, a current flowing through the power transmitting coil 102 may be changed.

The sensing coils 212, 222, and 232 output sensing signals s12, s22, and s32, respectively, depending on the approach of the foreign object or the wireless power receiver.

The circuitry 302 outputs a request signal req requesting transmission of information to the wireless power receiver, and receives an acknowledgement signal ack from the wireless power receiver. The acknowledgement signal ack may be an acknowledgement to the request signal req. In addition, the acknowledgement signal ack may be a signal indicating that a communications circuit in the wireless power receiver is being operated, and may include any one or any combination of any two or more of information on a magnitude of power received by the wireless power receiver, information on power output to a battery of the wireless power receiver, information on a state of charge of the battery of the wireless power receiver, and information on a magnitude of power required by the wireless power receiver.

In addition, the circuitry 302 confirms situations related to wireless transmission of the power using the acknowledgement signal ack, the sensing signals s12, s22, and s32, and a sensing signal for a current flowing through the power transmitting coil 102, and controls the transmission of the power through the power transmitting coil 102 depending on a result of the confirming of the situations related to the wireless transmission of the power.

Figure 4:
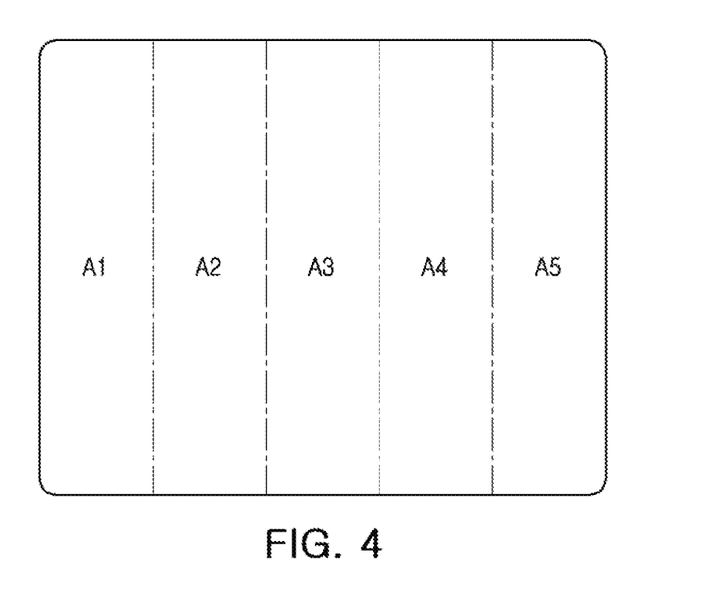
FIG. 4 is a schematic view illustrating a charging region divided into sub-regions in order to determine a position of a wireless power receiver in the wireless power transmitter of FIG. 3, according to an embodiment.

FIG. 4 is a schematic view illustrating a charging region divided into sub-regions A1 to A5 in order to determine a position of a wireless power receiver in the wireless power transmitter 10-1 of FIG. 3, according to another embodiment.

A method in which the circuitry 302 of the wireless power transmitter 10-1 determines a position of a wireless power receiver or an object approaching the wireless power receiver will be described with reference to FIGS. 3 and 4.

As illustrated in FIG. 3, when the wireless power transmitter 10-1 includes three sensing coils 212, 222, and 232, a charging region that is chargeable by the wireless power transmitter 10-1 may be divided into the five sub-region A1 to A5, as illustrated in FIG. 4.

The circuitry 302 compares magnitudes of the sensing signals s12, s22, and s32 and reference values with each other to determine in which sub-region in the charging region the object exists.

A method in which the circuitry 302 determines a sub-region in which the object is disposed will hereinafter be described with reference to Table 2. The sensing signals s12, s22, and s32 are current signals. In this case, in Table 2, magnitudes of the sensing signals s12, s22, and s32 are represented in mA. In addition, the circuitry 302 replaces all the values that are any minimum value or less among the sensing signals s12, s22, and s32 by 0 and then performs the following operations.

TABLE 2

| Division | Magnitude of Sensing signal | | | Sub-region in which Object Is Disposed |
|---|---|---|---|---|
| | S12 | S22 | S32 | |
| case 1 | 0 | 60 | 0 | A3 |
| case 2 | 35 | 35 | 0 | A2 |
| case 3 | 0 | 60 | 60 | A3, A5 |

The circuitry 302 determines the number of wireless power receivers disposed in the charging region using the sum of the magnitudes of the sensing signals, by a method similar to that described in Table 1.

In case 1 and case 2 in Table 2, the sum of magnitudes of the sensing signals is equal to or greater than 60 and does not exceed 120. Therefore, in case 1 and case 2, the circuitry 302 determines that the number of wireless power receivers disposed in the charging region is 1.

In case 3 in Table 2, the sum of magnitudes of the sensing signals is equal to or greater than 120. Therefore, in case 3, the circuitry 302 determines that the number of wireless power receivers disposed in the charging region is 2.

In addition, the circuitry 302 determines a position of the wireless power receiver by a method similar to that described in Table 1.

For example, in case 1, a magnitude of the sensing signal s22 is equal to or greater than the first reference value. Therefore, in case 1, the circuitry 302 determines that the wireless power receiver is disposed in the sub-region A3, which is a region corresponding to the sensing coil 222.

In case 2, the sum of magnitudes of the sensing signals s12 and s22 output from adjacent sensing coils 212 and 222 is equal to or greater than the second reference value. Therefore, in case 2, the circuitry 302 determines that the wireless power receiver is disposed in the sub-region A2, which is a region between the sensing coils 212 and 222.

In case 3, a magnitude of the sensing signal s22 is equal to or greater than the first reference value, and a magnitude of the sensing signal s32 is equal to or greater than the first reference value. Therefore, in case 3, the circuitry 302 determines that the wireless power receivers are disposed in the sub-region A3 and the sub-region A5.

A case in which the wireless power transmitter 10 includes the four sensing coils is illustrated in FIGS. 1 and 2 and a case in which the wireless power transmitter 10-1 includes the three sensing coils is illustrated in FIGS. 3 and 4, but the number of sensing coils may be changed in various ways, and the wireless power transmitter 10, 10-1 may also include only one sensing coil. In addition, the number and disposition positions of sub-regions of the charging region may be changed in various ways depending on the number and disposition positions of sensing coils.

In addition, although examples in which coils (that is, the sensing coils) are used in order to sense the wireless power receiver or the foreign object are illustrated in FIGS. 1 and 3, another type of sensor may also be used.

Figure 5:
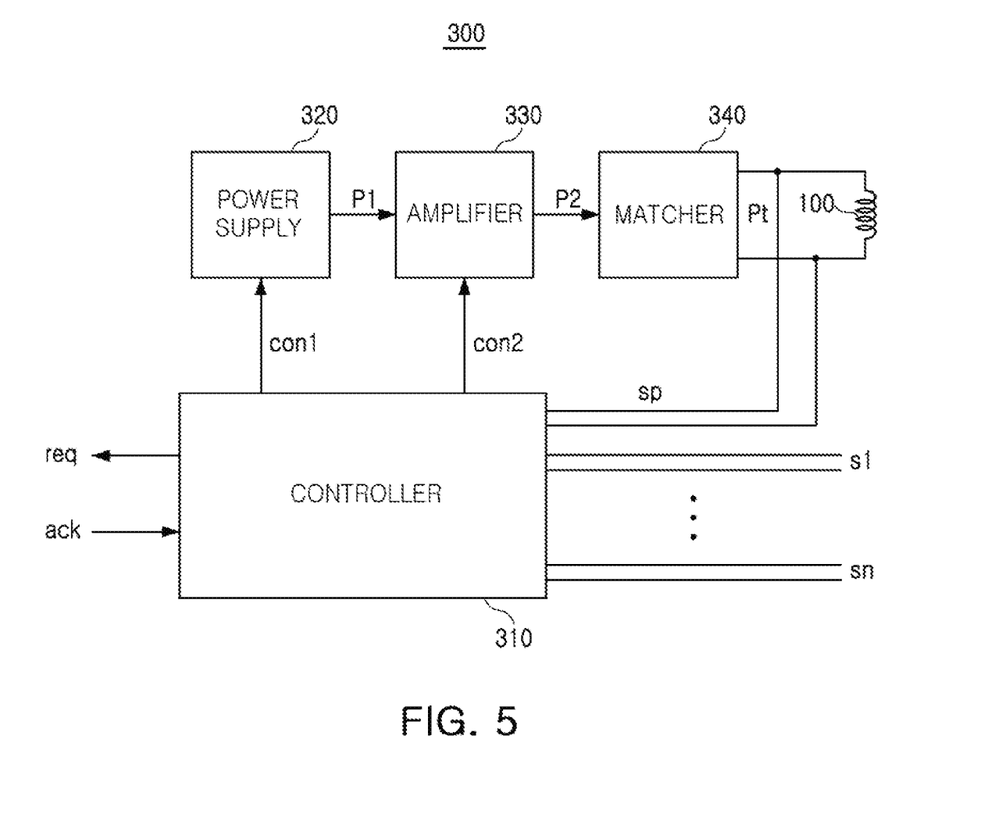
FIG. 5 is a schematic view illustrating an example of a circuitry of a wireless power transmitter, according to an embodiment.

FIG. 5 is a schematic view illustrating an example of a circuitry of a wireless power transmitter (e.g., the wireless transmitter 10 or 10-1), according to an embodiment. The circuitry 300 of the wireless power transmitter includes a controller 310, a power supply 320, an amplifier 330, and a matching unit or matcher 340.

The controller 310 receives a power sensing signal sp, which is a sensing signal for a current flowing through a power transmitting coil 100, one or more sensing signals s1, . . . , sn for currents flowing through each of one or more sensing coils, and an acknowledgement signal ack from a wireless power receiver, outputs a request signal req to the wireless power receiver, and outputs a first control signal con1 and a second control signal con2 to the power supply 320 and the amplifier 330, respectively. That is, the controller 310 determines situations related to wireless transmission of power using the power sensing signal sp, the sensing signal s1, . . . , sn, and the acknowledgement signal ack, and adjusts output power Pt applied to the power transmitting coil 100 depending on a result of the determining of the situations related to the wireless transmission of power to control the transmission of the power.

The controller 310 includes at least one processor and a memory. the at least one processor may include, for example, a central processing unit (CPU), a graphic processing unit (GPU), a microprocessor, an application specific integrated circuit (ASIC), or a field programmable gate arrays (FPGA), and may have multiple cores. The memory may be a volatile memory (for example, a random access memory (RAM), or the like), a non-volatile memory (for example, a read only memory (ROM), a flash memory, or the like), or a combination of a volatile memory and a non-volatile memory.

The power supply 320 outputs a first power signal P1 in response to the first control signal con1. The first power signal P1 may be an alternating current (AC) signal. The power supply 320 may include an inverter that outputs the first power signal P1. In addition, the power supply 320 may further include an adaptor that converts AC power input from an external source into direct current (DC) power and supplies the DC power to the inverter. In addition, the power supply 320 may further include a converter that adjusts a magnitude of the DC power applied to the inverter. An amplitude and a frequency of the first power signal P1 is adjusted by the first control signal con1.

The amplifier 330 amplifies the first power signal P1 to output a second power signal P2. An amplification ratio by the amplifier 330 is adjusted by the second control signal con2.

The matcher 340 performs a function such as an impedance matching function between the power transmitting coil 100 and the amplifier 330.

Although not illustrated, the wireless power transmitter 10, 10-1 may include an additional storage. The storage may include a magnetic storage or an optical storage, or the like, is not limited to these examples. Computer-readable commands for implementing one or more embodiments in this disclosure may be stored in the storage, and other computer-readable commands for implementing an operating system, and an application program, may also be stored in the storage. The computer-readable commands stored in the storage may be loaded into the memory of the controller 310 in order to be executed by the processor of the controller 310.

Figure 6:
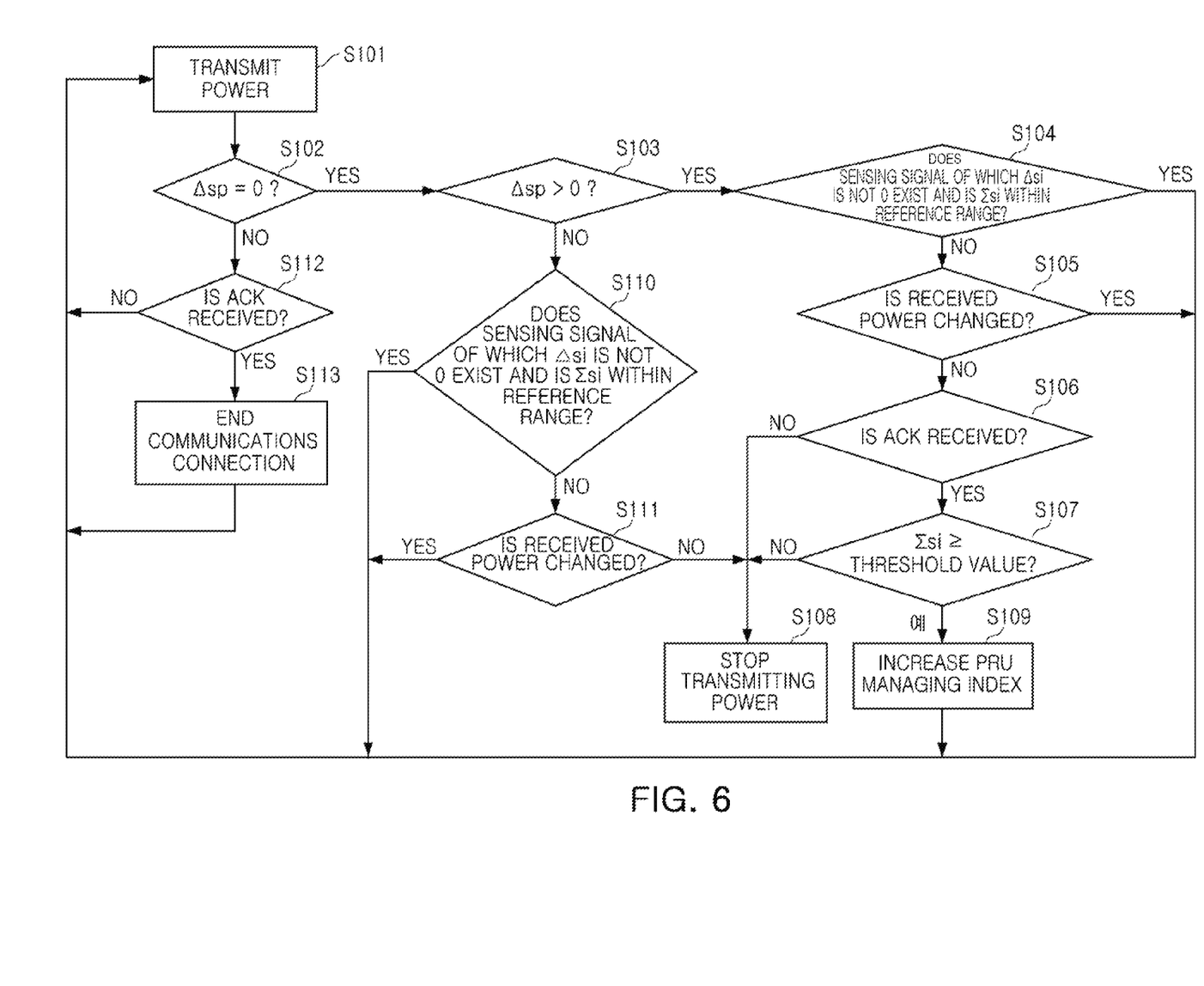
FIG. 6 is a flow chart describing operations of a wireless power transmitter, according to an embodiment.

FIG. 6 is a flow chart for describing operations of a wireless power transmitter (e.g., the wireless transmitter 10 or 10-1), according to an embodiment. The respective processes illustrated in FIG. 6 may be performed by the controller 310 of the wireless power transmitter 10, 10-1.

Operations S102 to S113 of FIG. 6 may be performed during a period in which the wireless power transmitter performs an operation of wirelessly transmitting power. That is, according to an embodiment, the wireless power transmitter determines whether the wireless power receiver moves, whether a new wireless power receiver is added, whether a cross connection (hereinafter, referred to as a first cross connection) in which a communications channel between the wireless power receiver entering a charging region in which the wireless power transmitter may transmit the power and another wireless power transmitter is connected occurs, whether a cross connection (hereinafter, referred to as a second cross connection) in which the wireless power receiver does not receive the power from the wireless power transmitter and only a communications channel between the wireless power receiver and the wireless power transmitter is connected occurs, and whether a foreign object enters the charging region, after the wireless power transmitter starts to transmit the power to the wireless power receiver (that is, during the period in which the wireless power transmitter wirelessly transmits the power to the wireless power receiver).

In operation S101, the controller receives an acknowledgement signal ack from the wireless power receiver, and adjusts power supplied to the wireless power receiver through the power transmitting coil using information included in the acknowledgement signal ack, for example, a magnitude of power received by the wireless power receiver, and a magnitude of power required by the wireless power receiver.

In operation S102, the controller determines whether the power sensing signal sp indicating the current flowing through the power transmitting coil is changed, during a period in which the power is transmitted to the wireless power receiver.

When it is determined in operation S102 that the power sensing signal sp is changed, the controller determines, in operation S103, whether a change amount $\Delta$sp of the power sensing signal sp is greater than 0, that is, whether a magnitude of the power sensing signal sp is increased. A change amount of a magnitude (for example, an amplitude) of the current flowing through the power transmitting coil may be the change amount $\Delta$sp of the power sensing signal sp. For example, the change amount $\Delta$sp of the power sensing signal sp may be defined as a value obtained by subtracting a magnitude of the previously sampled current flowing through the power transmitting coil from a magnitude of the currently sampled current flowing through the power transmitting coil.

When it is determined in operation S103 that the change amount $\Delta$sp of the power sensing signal sp is greater than 0, the controller determines, in operation S104, whether the wireless power receiver moves. In detail, the controller determines whether a sensing signal si of which a change amount $\Delta$Si is not 0, among sensing signals indicating currents flowing through one or more sensing coils, exists and whether the sum Σsi of the sensing signals exists in a reference range determined depending on the number of wireless power receivers, determines that the wireless power receiver moves in a case in which the sensing signal si of which the change amount ΔSi is not 0 exists and the sum Σsi of the sensing signals is within the reference range, and determines that the wireless power receiver does not move in other cases.

When it is determined in operation S104 that the wireless power receiver moves, the controller performs operation S101.

When it is determined in operation S104 that the wireless power receiver does not move, the controller determines, in operation S105, whether the power received by the wireless power receiver is changed. In operation S105, the controller may determine whether efficiency of power transmission to the wireless power receiver is changed, instead of determining whether the power received by the wireless power receiver is changed.

When it is determined in operation S105 that the power received by the wireless power receiver is changed, the controller performs operation S101.

When it is determined in operation S105 that the wireless power received by the wireless power receiver is not changed, the controller determines, in operation S106, whether the acknowledgement signal ack is received.

When it is determined in operation S106 that the acknowledgement signal ack is not received, the controller stops transmitting the power in operation S108.

When it is determined in operation S106 that the acknowledgement signal ack is received, the controller determines, in operation S107, whether the sum Σsi of the sensing signals is equal to or greater than a threshold value determined depending on the number of wireless power receivers.

When it is determined in operation S107 that the sum Σsi of the sensing signals is equal to or greater than the threshold value determined depending on the number of wireless power receivers, the controller increases the number of wireless power receivers, that is, a PRU managing index in operation S109, and then performs operation S101.

When it is determined in operation S107 that the sum Σsi of the sensing signals is lower than the threshold value determined depending on the number of wireless power receivers, the controller stops transmitting the power in operation S108. That is, when a magnitude of a current in the power transmitting coil is increased, but the wireless power receiver does not move, and the acknowledgement signal has been input, but it is not be considered that a new wireless power receiver enters the charging region, the controller determines that an error occurs in the wireless power receiver or the wireless power transmitter to cause the wireless power transmitter to stop transmitting the power.

When it is determined in operation S103 that the change amount Δsp of the power sensing signal sp is smaller than 0, the controller determines, in operation S110, whether the wireless power receiver moves. Operation S110 may be performed by the same method as that of S104.

When it is determined in operation S110 that the wireless power receiver moves, the controller performs operation S101.

When it is determined in operation S110 that the wireless power receiver does not move, the controller determines, in operation S111, whether the power received by the wireless power receiver is changed. In operation S111, the controller determine whether efficiency of power transmission to the wireless power receiver is changed, instead of determining whether the power received by the wireless power receiver is changed.

When it is determined in operation S111 that the power received by the wireless power receiver is changed, the controller performs operation S101.

When it is determined in operation S111 that the power received by the wireless power receiver is not changed, the controller stops transmitting the power in operation S108. That is, when a current amount of the power transmitting coil is decreased, but the wireless power receiver does not move and the power received by the wireless power receiver (or the efficiency of the power transmission to the wireless power receiver) is not changed, it is determined that an error occurs in the wireless power receiver (or the wireless power transmitter). Therefore, according to an embodiment, in this case, the controller stops transmitting the power.

When it is determined in operation S102 that the power sensing signal sp is not changed, the controller determines, in operation S112, whether the acknowledgement signal ack is received.

When it is determined in operation S112 that the acknowledgement signal ack is not received, the controller performs operation S101.

When it is determined in operation S112 that the acknowledgement signal ack is received, the controller ends a communications connection in operation S113, and then performs operation S101.

Figure 7:
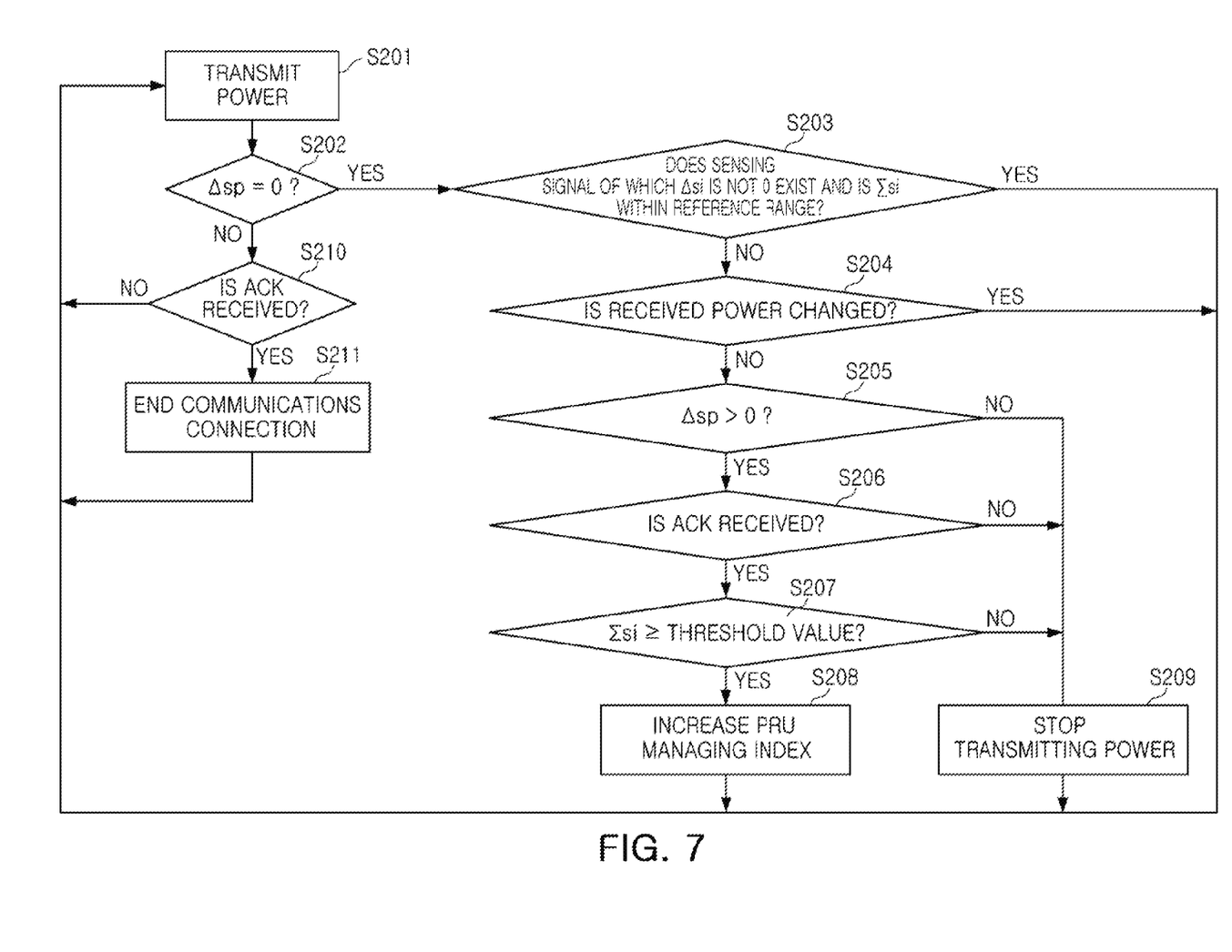
FIG. 7 is a flow chart for describing operations of a wireless power transmitter, according to another embodiment.

FIG. 7 is a flow chart for describing operations of a wireless power transmitter (e.g., the wireless transmitter 10 or 10-1), according to another embodiment. The respective processes illustrated in FIG. 7 may be performed by the controller 310 of the wireless power transmitter 10, 10-1.

As in the description in FIG. 6, operations S202 to S211 of FIG. 7 may be performed during a period in which the wireless power transmitter performs an operation of wirelessly transmitting power.

Operation S201 may be the same as S101.

In operation S202, the controller determines whether the power sensing signal sp indicating the current flowing through the power transmitting coil is changed, during a period in which the power is transmitted to the wireless power receiver.

When it is determined in operation S202 that the power sensing signal sp is changed, the controller determines, in operation S203, whether the wireless power receiver moves. Operation S203 may be performed by the same method as that described in operation S104.

When it is determined in operation S203 that the wireless power receiver moves, the controller performs operation S201.

When it is determined in operation S203 that the wireless power receiver does not move, the controller determines, in operation S204, whether the power received by the wireless power receiver is changed. In operation S204, the controller may determine whether efficiency of power transmission to the wireless power receiver is changed, instead of determining whether the power received by the wireless power receiver is changed.

When it is determined in operation S204 that the power received by the wireless power receiver is changed, the controller performs operation S201.

When it is determined in operation S204 that power received by the wireless power receiver is not changed, the controller determines, in operation S205, whether a change amount Δsp of the power sensing signal sp is greater than 0, that is, whether a magnitude of the power sensing signal sp is increased.

When it is determined in operation S205 that the change amount Δsp of the power sensing signal sp is smaller than 0, the controller stops transmitting the power in operation S209. That is, when the wireless power receiver does not move and the power received by the wireless power receiver (or the efficiency of the power transmission to the wireless power receiver) is not changed, but a current amount of the power transmitting coil is decreased, it is determined that an error occurs in the wireless power receiver (or the wireless power transmitter). Therefore, according to another embodiment, in this case, the controller stops transmitting the power.

When it is determined in operation S205 that the change amount Δsp of the power sensing signal sp is greater than 0, the controller determines, in operation S206, whether the acknowledgement signal ack is received.

When it is determined in operation S206 that the acknowledgement signal ack is not received, the controller stops transmitting the power in operation S209.

When it is determined in operation S206 that the acknowledgement signal ack is received, the controller determines, in operation S207, whether the sum Σsi of the sensing signals is equal to or greater than a threshold value determined depending on the number of wireless power receivers.

When it is determined in operation S207 that the sum Σsi of the sensing signals is equal to or greater than the threshold value determined depending on the number of wireless power receivers, the controller increases the number of wireless power receivers, that is, a PRU managing index in operation S208, and then performs operation S101.

When it is determined in operation S207 that the sum Σsi of the sensing signals is lower than the threshold value determined depending on the number of wireless power receivers, the controller stops transmitting the power operation S209).

When it is determined in operation S202 that the power sensing signal sp is not changed, the controller determines, in operation S210, whether the acknowledgement signal ack is received.

When it is determined in operation S210 that the acknowledgement signal ack is not received, the controller performs operation S201.

When it is determined in operation S210 that the acknowledgement signal ack is received, the controller ends a communications connection in operation S211, and then performs operation S201.

Some of the processes illustrated in FIGS. 6 and 7 may be omitted.

Operations of the wireless power transmitter 10 according to an embodiment will be described in detail with reference to FIGS. 1 and 2. Hereinafter, it is assumed that the wireless power transmitter 10 transmits power to one wireless power receiver, and it is assumed that a reference range is 60 to 80 and a threshold value is 120 when the number of wireless power receivers to which the power is transmitted is one.

First, when a new wireless power receiver normally enters the sub-region A6 during a period in which the wireless power transmitter 10 transmits power to a wireless power receiver disposed in the sub-region A1, a change amount Δsp of the power sensing signal becomes larger than 0 due to the new wireless power receiver entering the sub-region A6, and the wireless power transmitter receives the acknowledgement signal ack from the wireless power receiver, and the sensing signals S21 and S41 are changed as represented by the following Table 3.

TABLE 3

| | Before New Wireless Power Receiver Enters Sub-region A6 | After New Wireless Power Receiver Enters Sub-region A6 |
|---|---|---|
| S11 | 60 | 60 |
| S21 | 0 | 35 |
| S31 | 0 | 0 |
| S41 | 0 | 35 |

In this case, since the power sensing signal is changed and the change amount Δsp of the power sensing signal is greater than 0, operation S104 of FIG. 6 or operation S203 of FIG. 7 is performed.

Since the sensing signals S21 and S41 of which the magnitudes are changed exist, but the sum Σsi of the sensing signals S11, S21, S31, and S41 is not within the reference range, the controller 310 determines that the current of the power transmitting coil 101 is not changed by the movement of the wireless power receiver.

Therefore, the controller 310 performs operation S105 of FIG. 6 or operation S204 of FIG. 7. In this case, since a magnitude of the power received by the existing wireless power receiver is not changed and the wireless power transmitter 10 receives the acknowledgement signal ack, as described above, the controller performs operation S107 of FIG. 6 or operation S207 of FIG. 7.

Since the sum Σsi of the sensing signals S11, S21, S31, and S41 is equal to or greater than 120, which is the threshold value, the controller 310 determines that the new wireless power receiver enters the sub-region A6, increases the PRU managing index, and continues to transmit the power.

Next, when the new wireless power receiver enters the sub-region A6 during the period in which the wireless power transmitter 10 transmits the power to the wireless power receiver disposed in the sub-region A1, but a communications channel between the wireless power receiver and another wireless power transmitter is connected (that is, a cross connection occurs) or a foreign object enters the sub-region A6, a change amount Δsp of the power sensing signal becomes larger than 0 due to the new wireless power receiver or the foreign object entering the sub-region A6, and the wireless power transmitter 10 does not receive the acknowledgement signal ack, and the sensing signals S21 and S41 are changed as represented in the following Table 4.

TABLE 4

| | Before New Wireless Power Receiver Enters Sub-region A6 | After New Wireless Power Receiver Enters Sub-region A6 |
|---|---|---|
| S11 | 60 | 60 |
| S21 | 0 | 35 |
| S31 | 0 | 0 |
| S41 | 0 | 35 |

In this case, since the power sensing signal is changed and the change amount Δsp of the power sensing signal is greater than 0, operation S104 of FIG. 6 or operation S203 of FIG. 7 is performed.

Since the sensing signals S21 and S41 of which the magnitudes are changed exist, but the sum Σsi of the sensing signals S11, S21, S31, and S41 is not within the reference range, the controller 310 determines that the current of the power transmitting coil 101 is not changed by the movement of the wireless power receiver.

Therefore, the controller 310 performs operation S105 of FIG. 6 or operation S204 of FIG. 7. In this case, since a magnitude of the power received by the existing wireless power receiver is not changed, the controller 310 performs operation S106 of FIG. 6 or operation S206 of FIG. 7. Since the wireless power transmitter 10 does not receive the acknowledgement signal ack as described above, the controller 310 stops transmitting the power.

In such a manner, the controller 310 stops transmitting the power when the foreign object enters the sub-region A6 or the cross connection occurs.

Next, when the wireless power receiver disposed in the sub-region A1 moves to the sub-region A5 during the period in which the wireless power transmitter 10 transmits the power to the wireless power receiver disposed in the sub-region A1, the change amount Δsp of the power sensing signal becomes larger than 0 due to the movement of the wireless power receiver to a central portion of the power transmitting coil 101, the wireless power transmitter 10 receives the acknowledgement signal ack, and the sensing signals S11, S21, S31, and S41 are changed as represented in the following Table 5.

TABLE 5

| | Before Wireless Power Receiver Moves | After Wireless Power Receiver Moves |
| --- | --- | --- |
| S11 | 60 | 20 |
| S21 | 0 | 20 |
| S31 | 0 | 20 |
| S41 | 0 | 20 |

In this case, since the power sensing signal is changed and the change amount Δsp of the power sensing signal is greater than 0, operation S104 of FIG. 6 or operation S203 of FIG. 7 is performed.

Since the sensing signals S11, S21, S31, and S41 of which the magnitudes are changed exist, and the sum Σsi of the sensing signals S11, S21, S31, and S41 is within the reference range, the controller 310 determines that the current of the power transmitting coil 101 is changed by the movement of the wireless power receiver.

Therefore, the controller 310 continues to transmit the power to the wireless power receiver (operation S101 of FIG. 6 or operation S201 of FIG. 7).

Next, when the wireless power receiver disposed in the sub-region A5 moves to the sub-region A7 during the period in which the wireless power transmitter 10 transmits the power to the wireless power receiver disposed in the sub-region A5, the change amount Δsp of the power sensing signal becomes smaller than 0 due to the movement of the wireless power receiver to an outer side of the power transmitting coil 101, the wireless power transmitter 10 receives the acknowledgement signal ack, and the sensing signals S11, S21, S31, and S41 are changed as represented in the following Table 6.

TABLE 6

| | Before Wireless Power Receiver Moves | After Wireless Power Receiver Moves |
| --- | --- | --- |
| S11 | 20 | 0 |
| S21 | 20 | 0 |
| S31 | 20 | 60 |
| S41 | 20 | 0 |

In this case, since the power sensing signal is changed and the change amount Δsp of the power sensing signal is smaller than 0, operation S110 of FIG. 6 or operation S203 of FIG. 7 is performed.

Since the sensing signals S11, S21, S31, and S41 of which the magnitudes are changed exist, and the sum Σsi of the sensing signals S11, S21, S31, and S41 is within the reference range, the controller 310 determines that the current of the power transmitting coil 101 is changed by the movement of the wireless power receiver.

Therefore, the controller 310 continues to transmit the power to the wireless power receiver (operation S101 of FIG. 6 or operation S201 of FIG. 7).

Next, when only a communications channel between the wireless power transmitter 10 and a wireless power receiver that is not disposed in the charging region is connected (that is, a cross connection occurs) during the period in which the wireless power transmitter 10 transmits the power to the wireless power receiver disposed in the sub-region A1, the change amount Δsp of the power sensing signal does not exist, and the sensing signals S11, S21, S31, and S41 are not changed, but the wireless power transmitter 10 receives the acknowledgement signal ack from the wireless power receiver.

In this case, the controller 310 performs operations S112 and S113 of FIG. 6 or performs operations S210 and S211 of FIG. 7 to end a communications connection between the wireless power transmitter 10 and the wireless power receiver that is not disposed in the charging region, and continues to transmit the power to the wireless power receiver disposed in the sub-region A1.

As set forth above, the wireless power transmitter according to embodiments disclosed herein appropriately transmits the power depending on various situations related to the wireless transmission of the power, such as a change in a position of the wireless power receiver, occurrence of the cross connection, a situation in which the foreign object enters the range of the wireless power transmitter, and a situation in which the new wireless power receiver enters the range of the wireless power transmitter.

The controller 310, the power supply 320, the amplifier 330, and the matcher 340 in FIG. 5 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 6 and 7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter, comprising:
a power transmitting coil configured to receive alternating current (AC) power applied thereto and wirelessly transmit the AC power;
a sensing device configured to output one or more sensing signals comprising magnitudes that are variable based on an approach of an object; and
a circuitry configured to determine whether an acknowledgement signal has been received from a wireless power receiver and whether a foreign object has entered a region of the wireless power transmitter based on a change in the magnitudes of the one or more sensing signals, and configured to control transmission of the AC power through the power transmitting coil based on a result of the determining of whether the acknowledgement signal has been received from the wireless power receiver and whether the foreign object has entered the region of the wireless power transmitter, wherein the circuitry is configured to determine a number of wireless power receivers disposed in the region using a sum of the magnitudes of the one or more sensing signals.

2. The wireless power transmitter of claim 1, wherein the sensing device comprises one or more sensing coils disposed inside the power transmitting coil and configured to output the one or more sensing signals.

3. The wireless power transmitter of claim 2, wherein the one or more sensing coils are disposed in a region inside an inner diameter of the power transmitting coil.

4. The wireless power transmitter of claim 1, wherein the circuitry is further configured to determine, based on the change in the magnitudes of the one or more sensing signals, whether the wireless power receiver moves, and is further configured to determine that the foreign object enters the region of the wireless power transmitter and to stop transmission of the AC power through the power transmitting coil, in response to determining that the wireless power receiver does not move and the acknowledgement signal is not received.

5. The wireless power transmitter of claim 4, wherein the circuitry is further configured to determine that the wireless power receiver moves, in response to a sensing signal, among the one or more sensing signals, comprising a magnitude, among the magnitudes, that is changed and the sum of the magnitudes of the one or more sensing signals being within a reference range, and is further configured to otherwise determine that the wireless power receiver does not move.

6. The wireless power transmitter of claim 1, wherein the circuitry is further configured to determine, based on the change in the magnitudes of the one or more sensing signals, whether the wireless power receiver moves, and to determine that another wireless power receiver enters the region of the wireless power transmitter, in response to determining that the wireless power receiver does not move, the acknowledgement signal has been received, and the sum of the magnitudes of the one or more sensing signals is equal to or greater than a threshold value.

7. The wireless power transmitter of claim 1, wherein the circuitry is further configured to determine, based on the change in the magnitudes of the one or more sensing signals, whether the wireless power receiver moves, and is further configured to stop transmission of the AC power through the power transmitting coil, in response to determining that the wireless power receiver does not move, the acknowledgement signal has been received, and the sum of the magnitudes of the one or more sensing signals is smaller than a threshold value.

8. The wireless power transmitter of claim 1, wherein the circuitry is further configured to end communications with the wireless power receiver, in response to the acknowledgement signal being received and a magnitude of a current of the power transmitting coil not changing.

9. The wireless power transmitter of claim 1, wherein the circuitry is further configured to determine whether the foreign object enters the region of the wireless power transmitter, in response to a magnitude of a current of the power transmitting coil changing.

10. A wireless power transmitter, comprising:

a power transmitting coil configured to wirelessly transmit AC power;

a sensing device configured to output one or more sensing signals comprising magnitudes that are variable based on an approach of an object; and a circuitry configured to output the AC power in response to an acknowledgement signal received from a wireless power receiver and the one or more sensing signals during a period in which the power transmitting coil wirelessly transmits the AC power, wherein the circuitry is configured to determine a number of wireless power receivers disposed in a region using a sum of the magnitudes of the one or more sensing signals.

11. The wireless power transmitter of claim 10, wherein the sensing device comprises one or more sensing coils disposed inside the power transmitting coil and configured to output the one or more sensing signals.

12. The wireless power transmitter of claim 11, wherein the one or more sensing coils are disposed in a region inside an inner diameter of the power transmitting coil.

13. The wireless power transmitter of claim 10, wherein the circuitry is further configured to stop outputting the AC power in response to the acknowledgement signal not being received, in a case in which no sensing signal, among the one or more sensing signals, comprises a magnitude, among the magnitudes, that is changed or the sum of the magnitudes of the one or more sensing signals is outside of a reference range.

14. The wireless power transmitter of claim 10, wherein the circuitry is further configured to stop outputting the AC power in response to the acknowledgement signal being input and the sum of the magnitudes of the one or more sensing signals being smaller than a threshold value, in a case in which no sensing signal, among the one or more sensing signals, comprises a magnitude, among the magnitudes, that is changed or the sum of the magnitudes of the one or more sensing signals is out of a reference range.

15. The wireless power transmitter of claim 10, wherein the circuitry is further configured to update information on a number of wireless power receivers that are receiving the power and to output the AC power, in response to the acknowledgement signal being received and the sum of the magnitudes of the one or more sensing signals being greater than a threshold value, in a case in which no sensing signal, among the one or more sensing signals, comprises a magnitude, among the magnitudes, that is changed or the sum of the magnitudes of the one or more sensing signals is outside of a reference range.

16. The wireless power transmitter of claim 10, wherein the circuitry is further configured to end communications with the wireless power receiver, in response to the acknowledgement signal being received, in a case in which a magnitude of a current of the power transmitting coil is not changed.

17. The wireless power transmitter of claim 10, wherein the circuitry is further configured to stop outputting the AC power, in response to no sensing signal, among the one or more sensing signals, comprising a magnitude, among the magnitudes, that is changed or the sum of the magnitudes of the one or more sensing signals being outside of a reference range, in a case in which a magnitude of a current of the power transmitting coil is decreased.

* * * * *